Patented Sept. 26, 1950

2,523,692

UNITED STATES PATENT OFFICE 2,523,692

ESTER CONDENSATION

Don E. Floyd, Minneapolis, Minn., assignor to General Mills, Inc., a corporation of Delaware No Drawing. Application May 30, 1945,
Serial No. 596,811

5 Claims. (Cl. 260—483)

1

The present invention relates to the transformation of esters of fatty acids or mixtures thereof in which the acidic residue in the ester molecule contains five or more carbon atoms, to the corresponding alpha-ethoxalyl derivatives and to the products of the transformation.

It has been found that it is possible to condense fatty acid esters having five or more carbon atoms in the fatty acid group with esters of oxalic acid to introduce the ethoxalyl group on the alpha carbon atom of the fatty acid ester, and to form reactive metallo derivatives of these compounds. Such ethoxalyl esters can be decarbonylated to yield alkyl-substituted malonic esters or converted to other valuable products. The ethoxalyl esters and the substituted malonic esters are valuable as intermediates in the preparation of plasticizers, waxes, resins, drying oils, detergents, and compounds with pharmacological activity.

It is, therefore, an object of the present invention to provide a novel process of condensing fatty acid esters having five or more carbon atoms in the fatty acid group with esters of oxalic acid. It is another object of the invention to provide a novel process of producing alkyl-substituted malonic esters. It is a further object of the invention to provide novel ethoxalyl derivatives of fatty acid esters having five or more carbon atoms in the fatty acid group.

The invention involves reactions between esters of fatty acids or mixtures thereof in which the acid group contains five or more carbon atoms and esters of oxalic acid in the presence of a condensation catalyst preferably a metal alcoholate such as an alkali metal alcoholate. The general reaction may be represented by the following equation:

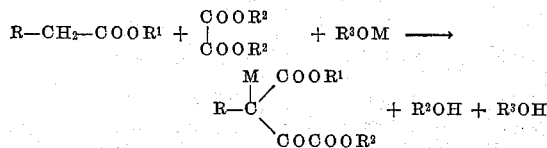

R stands for a hydrocarbon radicle having three or more carbon atoms, in which no multiple bond stands adjacent to the alpha methylene group of the ester. $R^1$, $R^2$, and $R^3$ are alkyl groups such as methyl, ethyl, butyl, propyl and the like, and may be alike or different. It will be apparent that the $R^2$ groups on the oxalate ester may be alike or different. It is preferred that the group be of low molecular weight since alcohols

2 resulting therefrom are more easily removed in later stages of process. M is a metal, preferably of the alkali metal group. When groups $R^1$, $R^2$, and $R^3$ differ from one another, some ester interchange may take place during the course of the reaction.

The reaction product in the form of the metallo derivative may be isolated without difficulty and subjected to further transformations. For example, the metallo group can readily be replaced by hydrogen or by an alkyl group in accordance with known methods.

It has been found that the reaction proceeds to completion by distilling off the by-product alcohol or alcohols from the reaction mixture. By employing low aliphatic groups in $R^1$, $R^2$, and $R^3$, the resultant alcohols are relatively volatile and can be readily distilled from the ethoxalyl derivative and the reactants which have materially higher boiling points, without the use of any special fractionating equipment. It is desirable in most instances to conduct the reaction under a partial vacuum thereby maintaining a correspondingly lower temperature of reaction, thus preventing excessive decomposition and charring due to heat, and at the same time facilitating the removal of the by-product alcohol.

Various condensation catalysts may be used, such as alkali and alkaline earth metals, metal alcoholates, metal amides, metal hydrides, organic metallic compounds, and the like as is well understood by those skilled in the art. It is preferred, however, to use the metal alcoholate as this catalyst does not promote undesirable side reactions such as acylon condensation and reduction, and also reduces the fire hazard. The metal alcoholate may be introduced into the reaction mixture free of alcohol or dissolved in alcohol solution. In the latter case the alcohol used as solvent can be distilled off as the reaction progresses along with the alcohol or alcohols produced in the reaction. The metal alcoholate or its alcohol solution can be dispersed in an inert solvent, such as ether, benzene, or suitable aromatic and aliphatic hydrocarbons. Such solvents can be distilled from the reaction mixture and in some cases form azeotropes with the alcohol and facilitate its removal during the distillation.

During a mixed ester condensation such as that described herein, at least two competing reactions are possible. The oxalate ester can react with the fatty acid ester, mole for mole. It is also possible for the fatty acid ester to condense with itself to give the so-called selfcondensation product or aceto-acetic ester type compound. It has been found possible to virtually eliminate the second reaction and to produce high yields of the first type of reaction product by using a considerable excess of the oxalate ester. This excess has a two-fold effect. First, it acts as a solvent and diluent for the fatty acid ester and thus reduces the rate of this second reaction considerably by reducing the concentration of the fatty acid ester. Second, it has a promoting effect on the oxalate ester condensation by increasing the concentration of one of the reactants. It is thus possible to produce high yields of the alpha-ethoxalyl ester—a molal ratio of from 2 to 4 or more of oxalate ester to one of fatty acid ester is preferred, although some reduction below the 2 to 1 ratio can be made. The excess oxalate ester can be recovered substantially quantitatively in an unchanged condition by distillation from the reaction product and can be used in subsequent condensation.

The fatty acid esters employed in the condensation may contain from 5 to 18 or more carbon atoms in the acid group. They may be saturated or unsaturated but should not have a multiple bond adjacent to the alpha-methylene group. They may be mixed or isolated acids derived from natural or synthetic sources, such as animal, vegetable, and marine oils, and acids derived from oxidation of petroleum products. Examples of such oils are palm, cottonseed, corn, sunflower seed, soybean, linseed, oiticica, tung, perilla, sardine, menhaden, and the like. The fatty acids employed herein may be in the natural form or may be substituted acids as for example where hydroxyl, halogen or other substituents have been introduced. They may also be straight or branched chain acids as long as the alpha carbon atom has a replaceable hydrogen atom attached thereto. All of these compounds are contemplated in the term, "fatty acid," as used herein and in the claims. The properties of the resulting condensation products will depend to some extent on the length and the nature of the fatty acid chain.

The metallo derivative of the ethoxalyl compound may be recovered as such, or it may be converted to the free ester by treatment with acid, either mineral or organic such as hydrochloric, sulfuric, acetic, and the like. The metallo derivative and the free ester may be used as such, or may be used as intermediates in the preparation of waxes, plasticizers, resins, drying oils, detergents, and compounds with pharmacological activity. It is also possible to decarbonylate the ester to an alkyl malonic ester. The malonic ester may be used as such and also finds utility as a starting material in the same manner that unsubstituted malonic ester is now employed.

For example, esters and linear polyesters, amide esters, amides, polyamides, alkyds, derived from the reaction of these substituted malonates with such compounds as ethylene glycol, polyethylene glycols, glycerol, pentaerythritol, ethylene diamine, hexamethylene diamine, ethanolamines and the like have been found to be valuable as drying oils, plasticizers, wetting agents, detergents, waxes, etc. Moreover, barbiturates prepared from these substituted malonates have unusual properties.

The following examples will serve to illustrate the invention and are to be considered as illustrative only and not as limiting the invention.

Example 1

Thirty-four grams (0.5 mole) of alcohol-free sodium ethylate was dissolved in 292 g. (2.0 moles) of ethyl oxalate in a flask protected from moisture of the air by a calcium chloride tube, and to this solution was added 72 g. (0.5 mole) of ethyl caproate. The solution became yellow in color at this point. The flask was attached to a still-head and condenser connected to a cooled receiver. A vacuum of about 100 mm. was maintained while the reaction mixture was heated gently in such a manner that alcohol was slowly distilled over into the receiving vessel. When no more alcohol was produced (1-2 hrs. depending on rate of heating), the excess ethyl oxalate was distilled from the reaction mixture at a pressure of about 15 mm. The recovery of this excess was nearly quantitative. The brown-colored residue which remained consisted of the sodio derivative of the ethyl alpha-ethoxalylcaproate. The yield was nearly quantitative.

This sodio derivative was converted to the free ester by treatment with a slight excess of dilute acetic acid and the free ester was extracted with ether. This extract was washed free of acid and salts and then dried. Elimination of the ether by distillation produced ethyl alpha-ethoxalylcaproate.

The ethyl alpha-ethoxalylcaproate was heated at 160-5° C., whereupon it decomposed to give diethyl butylmalonate with the evolution of carbon monoxide. This ester was then distilled and was found to boil at 130-3°/17 mm. The weight of the diethyl butylmalonate was 98.2 g., which amounted to an overall yield of 91%, based on the amount of ethyl caproate used.

Example 2

Reaction between 34 g. (0.5 mole) of sodium ethylate, 292 g. (2.0 moles) of ethyl oxalate and 128 g. (0.5 mole) of ethyl myristate was conducted as in the previous example. The product was worked up in a similar manner to produce ethyl alpha-ethoxalylmyristate.

The ethyl alpha-ethoxalylmyristate was found to decompose at about 170° C. to produce diethyl dodecylmalonate and carbon monoxide. The diethyl dodecylmalonate boiled at 169-173°/2.5 mm. The yield amounted to 147.1 g. or 89%.

Example 3

Eleven and five-tenths grams (0.5 mole) of sodium metal (freshly cut) was dissolved in 150 cc. of absolute ethanol. To this solution was added 292 g. (2 moles) of ethyl oxalate and 128 g. (0.5 mole) of ethyl myristate. A procedure similar to that described in Examples 1 and 2 was followed except that the alcohol used as solvent was distilled off during the reaction in addition to the alcohol produced as a reaction by-product. The product was worked up as before, producing ethyl alpha-ethoxalylmyristate. Decarbonylation gave the same malonic ester as in Example 2, diethyl dodecylmalonate. The overall yield was 90%.

Example 4

Thirty-four grams (0.5 mole) of alcohol-free sodium ethylate was dissolved in 292 g. (2.0 moles) of ethyl oxalate, and to this solution was added 156 g. (0.5 mole) of ethyl stearate. The reaction mixture, in a flask connected by a small stillhead to a condenser and cooled receiver, was heated gently while a pressure of about 100 mm. was maintained on the system. In this manner the alcohol formed as a by-product of the reaction was distilled over into the receiver. When no more alcohol was formed the reaction was assumed to be complete and the excess ethyl oxalate was distilled off at about 15 mm. pressure. The recovery of this excess was nearly quantitative. The sodio derivative of the ethyl alpha-ethoxalylstearate was converted to the free ester by acidifying with acetic acid solution. The ester was separated, washed, and dried in the usual manner. The yield was nearly quantitative.

This ethyl alpha-ethoxyalylstearate was decarbonylated by heating at about 175°. The use of a partial vacuum was helpful in removing carbon monoxide which was evolved. The diethyl cetylmalonate formed during decarbonylation was distilled and 172.5 g. of the ester, boiling at 195–200°/2 mm. was obtained. This corresponds to an overall yield of 90% based on the amount of ethyl stearate used.

Example 5

34 g. (0.5 mole) of sodium ethylate, 146 g. (1 mole) of ethyl oxalate and 114 g. (0.5 mole) of ethyl laurate were allowed to react in a manner similar to that described in previous examples. The crude reaction product was acidified and washed before decarbonylation. The diethyl decylmalonate produced by the decarbonylation at 165–170° C. was distilled in vacuum. It boiled at 145–149°/2 mm. The yield amounted to 127.3 g. or about 85%. A small amount of non-distillable residue remained behind.

Example 6

20 g. (0.5 mole) of metallic potassium was dissolved in 150 cc. of absolute ethanol. To this solution was added 292 g. (2 moles) of ethyl oxalate and 86 g. (0.5 mole) of ethyl caprylate. From this point on the general procedure described in other instances was followed, the solvent alcohol and the by-product alcohol being removed by distillation during the reaction. The condensation product was worked up and thermally decarbonylated at 160–165° C. The diethyl hexylmalonate which was produced was distilled and collected. The boiling point was 146–149°/15 mm. The yield was 105.6 g. or nearly 87% of the theoretical.

Example 7

11.5 g. (0.5 mole) of sodium was dissolved in 200 cc. of n-butyl alcohol at about 80–85° C. with the usual precautions against moisture. 404 g. (2 moles) of n-butyl oxalate and 128 g. (0.5 mole) of n-butyl laurate were added. The mixture was heated gently at a pressure of about 90 mm. in such a manner that the n-butyl alcohol used as solvent and that formed during the reaction distilled from the reaction (B. P. 58–63°/90 mm.). After two and one-half hours no more of the alcohol was obtained. The excess of n-butyl oxalate was then distilled off at a pressure of 10 mm. The recovery of the excess was nearly quantitative.

This condensation product was acidified and worked up in the usual manner. It was thermally decarbonylated at 160–165° C. The dibutyl decylmalonate produced was distilled and was found to boil at 170–173°/2 mm. A total of 158.7 g. was obtained, which would correspond to an overall yield of about 89%.

Example 8

To 27 g. (0.5 mole) of alcohol-free sodium methylate was added 219 g. (1.5 moles) of ethyl oxalate and 147 g. (0.5 mole) of the methyl esters of soybean oil fatty acids (prepared by alcoholysis of soybean oil). Reaction was carried out as in the other examples with the elimination of the alcohol formed in the reaction. After distillation of the mixed oxalic esters still in excess, the condensation product was carried through the steps outlined in the preceding examples. The alpha-ethoxalyl esters produced were decarbonylated at about 175° C. to produce the corresponding malonic esters. These were distilled and boiled at 190–198°/3 mm. The yield was 163 g.

Example 9

23 g. (1 mole) of sodium was used to prepare sodium ethylate in the usual manner. To the sodium ethylate solution in alcohol was added 584 g. (4 moles) of ethyl oxalate and then 306 g. (1 mole) of the ethyl esters of linseed oil fatty acids. The reacion was conducted as in other examples until the ethyl oxalate used in excess had been removed. Then the metallo derivative was divided into two equal portions (A and B).

Portion A was acidified and washed to give the alpha-ethoxalyl derivative. This was decarbonylated at 160–165° C. to produce the corresponding malonic ester which was distilled in vacuum. 170 g. or 90% of ester boiling at 185–195°/2 mm. was obtained.

Portion B was dissolved in 150 cc. of dry benzene and refluxed gently with 75 g. of allyl bromide for four hours. Sodium bromide settled out of solution during this period. The reaction mixture was poured into cold water and the organic layer was separated and washed free of inorganic salts. The benzene and excess allyl bromide were distilled off and then the allyl derivative of the alpha-ethoxalyl ester was thermally decarbonylated at 185–190° C. The corresponding allylmalonic ester which was produced boiled at 195–200°/1.5 mm. The yield was 178 g. or about 85% overall yield.

Alkylation of the metallo derivatives of alpha-ethoxalyl esters by use of alkyl halides such as ethyl bromide and n-butyl bromide can be carried out using slightly modified procedure from that described for the allyl bromide reaction reported above.

While various conditions for the reaction are shown in the examples it will be apparent that they may be varied within limits. For example, the reaction time may be varied from one to several hours depending on the rate of heating, concentration of reactants, the catalyst employed, and the like. The excess oxalate ester may be recovered before or after tranformation of the metallo derivative. The pressure on the system may be varied from atmospheric to high vacuum providing the reaction temperature is correspondingly controlled. A solvent may or may not be employed during the reaction depending upon the character of the ester being condensed and depending upon the convenience desired. Other variations will be apparent to those skilled in the art and accordingly it is to be understood that the invention is not limited to the specific details set forth herein but may be varied within the scope of the appended claims.

I claim as my invention:

1. The process which comprises condensing a low aliphatic ester of a fatty acid having more than four carbon atoms in the acid group, with a large excess of a low aliphatic diester of oxalic acid in the presence of an approximately equimolar amount of an alkaline condensing agent based on the fatty acid ester, in the absence of a solvent, distilling off the low aliphatic alcohol formed during the reaction to form an oxalyl derivative of the fatty acid ester.

2. The process which comprises condensing a low aliphatic ester of a fatty acid having more than four carbon atoms in the acid group, and having from one to four carbon atoms in the alcohol group of the ester, with a low aliphatic diester of oxalic acid, the alcohol group of the diester containing from one to four carbon atoms, in the presence of an akaline condensing agent, the condensing agent and the fatty acid ester being employed in approximately equi-molar proportions and the oxalic acid ester being employed in the approximate proportion of two to four moles per mole of fatty acid ester, the reaction being carried out in the absence of a solvent, and distilling off the low aliphatic alcohol formed during the reaction, to produce an oxalyl derivative of the fatty acid ester.

3. Process according to claim 1 in which the fatty acid is a higher fatty acid.

4. Process according to claim 1 in which the fatty acid group is the mixed fatty acid groups of a fatty oil.

5. The process which comprises condensing a molar proportion of an ethyl ester of a higher fatty acid, with from approximately two to four molar proportions of ethyl oxalate in the presence of approximately one molar proportion of an alkaline condensing agent, in the absence of a catalyst, distilling off the ethyl alcohol formed during the reaction, to produce an ethoxalyl derivative of the fatty acid ester.

DON E. FLOYD.

REFERENCES CITED

The following references are of record in the file of this patent:

UNITED STATES PATENTS

| Number | Name | Date |
|---|---|---|
| 1,524,962 | Altwegg | Feb. 3, 1925 |
| 1,948,201 | Carter | Feb. 20, 1934 |
| 2,158,071 | Hansley | May 16, 1939 |

FOREIGN PATENTS

| Number | Country | Date |
|---|---|---|
| 304,118 | Great Britain | Nov. 21, 1929 |

OTHER REFERENCES

Hurd, The Pyrolysis of Carbon Compounds, 1929, pp. 556 and 557.

C. A., 35, 3229–3230 (1941).

C. A., 36, 410, 6 (1942).

Galimberti, Gazz. Chem. Ital., 72, 125–130 (1942).

Adickes, Annalen 555, 41–56 (1943).